United States Patent
Kojo et al.

(10) Patent No.: US 8,243,906 B2
(45) Date of Patent: Aug. 14, 2012

(54) GROUP COMMUNICATION SYSTEM, GROUP ID NUMBER ISSUING APPARATUS, AND CALL CONTROL APPARATUS

(75) Inventors: Yu Kojo, Kawasaki (JP); Masami Yabusaki, Kashiwa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 639 days.

(21) Appl. No.: 12/405,895

(22) Filed: Mar. 17, 2009

(65) Prior Publication Data

US 2009/0238356 A1 Sep. 24, 2009

(30) Foreign Application Priority Data

Mar. 18, 2008 (JP) .................. 2008-069976

(51) Int. Cl.
*H04M 3/56* (2006.01)
*H04L 12/18* (2006.01)
*H04B 7/00* (2006.01)

(52) U.S. Cl. ............... 379/204.01; 370/260; 370/261; 379/205.01; 455/416; 455/518; 455/519

(58) Field of Classification Search .......... 370/260–262; 379/202.01–206.01; 455/416, 518, 519
See application file for complete search history.

(56) References Cited

U.S. PATENT DOCUMENTS

| | | |
|---|---|---|
| 6,687,234 B1 | 2/2004 | Shaffer et al. |
| 2005/0117714 A1 | 6/2005 | Chingon et al. |
| 2005/0164727 A1 | 7/2005 | Hasegawa |
| 2005/0192041 A1 | 9/2005 | Oxley et al. |
| 2005/0213740 A1 | 9/2005 | Williams et al. |
| 2006/0234692 A1 | 10/2006 | Shimokawa et al. |
| 2007/0281724 A1 | 12/2007 | Isobe et al. |
| 2008/0064430 A1 | 3/2008 | Kraft et al. |
| 2008/0070570 A1 | 3/2008 | Jiang |

FOREIGN PATENT DOCUMENTS

| | | |
|---|---|---|
| EP | 0 592 846 A1 | 4/1994 |
| EP | 0 999 686 A2 | 5/2000 |
| EP | 1 294 165 A1 | 3/2003 |
| GB | 2 391 750 A | 2/2004 |
| JP | 11-239219 | 8/1999 |
| JP | 2002-232575 A | 8/2002 |
| JP | 2005-38276 A | 2/2005 |

(Continued)

OTHER PUBLICATIONS

Chinese Office Action w/Translation, dated Jul. 25, 2011, 17 pages total.

(Continued)

*Primary Examiner* — Harry Hong
(74) *Attorney, Agent, or Firm* — Crowell & Moring LLP

(57) ABSTRACT

There is provided a group communication system allowing group communication to be performed by a simple operation as well as a group ID number issuing apparatus and a call control apparatus to be applied to such a group communication system. When a user takes a group organization procedure to the group communication system, a group representative telephone number representing the group is issued. After the group representative telephone number is issued, the group representative telephone number can be used in the same manner as for calling a subscriber to call a group member to perform group communication. The group communication can be performed by limiting to a lower level subgroup, a pair of the group representative telephone number and an identifier can be used instead of the subscriber's telephone number to determine the calling partner to make a call.

11 Claims, 9 Drawing Sheets

FOREIGN PATENT DOCUMENTS

| | | |
|---|---|---|
| JP | 2005-229406 A | 8/2005 |
| JP | 2006-295897 A | 10/2006 |
| JP | 2007-142903 A | 6/2007 |
| JP | 2007-221592 A | 8/2007 |
| JP | 2007-329582 A | 12/2007 |
| WO | WO 01/65872 A1 | 9/2001 |
| WO | WO 2005/057890 A2 | 6/2005 |
| WO | WO 2006/043792 A1 | 4/2006 |
| WO | WO 2006/055227 A2 | 5/2006 |
| WO | WO 2006/083203 A1 | 8/2006 |

OTHER PUBLICATIONS

Japanese Office Action w/Translation, dated Mar. 21, 2012, 6 pages total.

F I G. 4
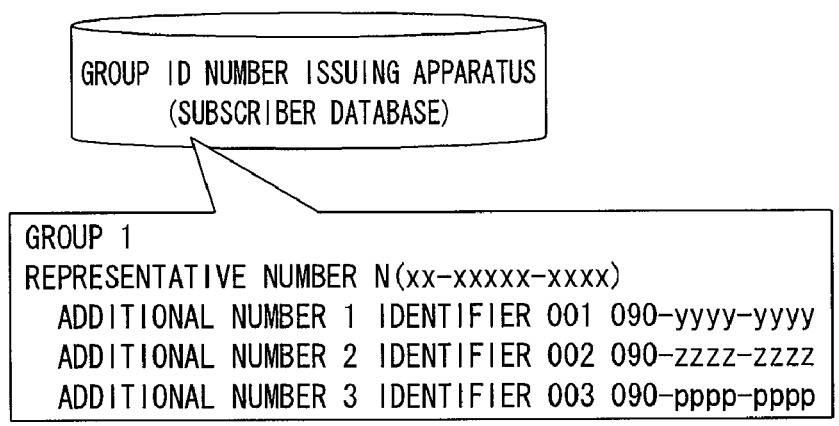
F I G. 5
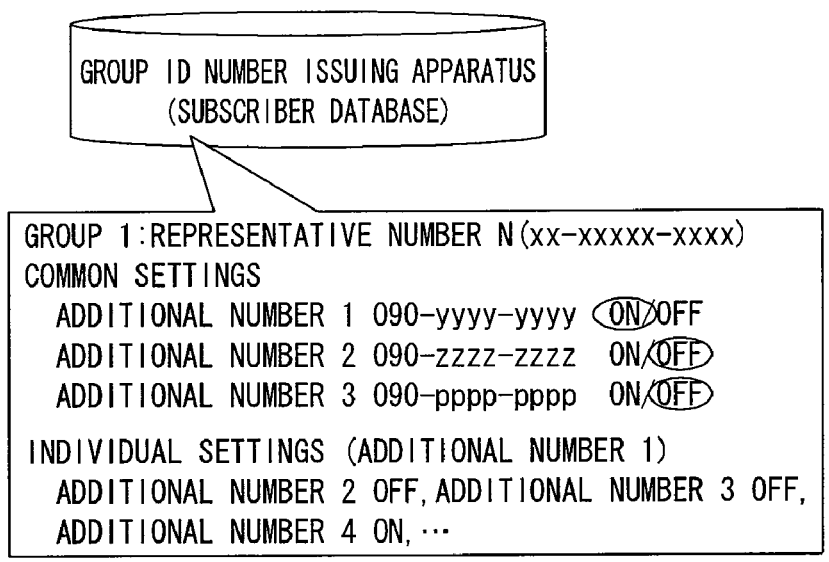

GROUP COMMUNICATION SYSTEM, GROUP ID NUMBER ISSUING APPARATUS, AND CALL CONTROL APPARATUS

BACKGROUND OF THE INVENTION

1. Field of the Invention

The present invention relates to a group communication system, a group ID number issuing apparatus, and a call control apparatus for providing a plurality of subscribers belonging to a predetermined group with a so-called group communication service performing intercommunication of the terminal devices.

2. Description of the Related Art

Recent years have seen considerable progress in an IP Multimedia Subsystem (IMS), which is a solution using an IP (Internet Protocol) network to provide communication services which have been provided through a conventional fixed-line phone, mobile communication, broadcasting, and the like (for example, see 3GPP TS23.228, IP Multimedia Subsystem (IMS)). The IMS allows a flexible call control to be performed on an voice call and a TV phone over the IP network.

Still alternatively, JP-A-2007-142903 (Abstract, paragraphs 0002-0004 etc.) has proposed a technique using an MCU (Multi Point control Unit) to build an optimal communication path for performing group communication, that is, a plurality of persons perform communication at the same time.

Conventionally, users intending to perform group communication have been used the above described MCU or a server to specify a communication partner to obtain a desired connection, or have been used a service in the form of using a special communication tool such as a PoC (Push talk over Cellular) standardized by OMA (Open Mobile Alliance).

It should be noted that the PoC is a service using the IP network to perform one-way communication and allows calling parties to be grouped. One party or a plurality of parties belonging to a group in calling state can be selected. When a call button is pressed, communication can be initiated.

In addition, in such a PoC communication, JP-A-2006-295897 (Abstract, paragraph 0021 etc.) proposes a technique which does not notify the other users of the user's own address depending on the user's setting.

Further, regarding the group communication, various proposals have been made to pursue convenience from diverse points of view.

For example, JP-A-2007-329582 (Abstract, paragraph 0012 etc.) proposes to reduce the workload of a user in forming a subgroup and the like for group communication to easily enable inter-subgroup communication.

JP-A-2007-329582 discloses that a group communication server stores subgroup information defining a subgroup in a group and timing information for establishing intercommunication connections of terminal devices belonging to the subgroup, as well as a control means is provided to control establishing connections among terminal devices belonging to the subgroup at the timing based on the timing information.

The connections among terminal devices are controlled based on subgroup information complied as a database to eliminate the need for a user to form a subgroup, change a terminal belonging to the subgroup, and other operations. Therefore, it is proposed to be possible to reduce the workload of the user in forming a subgroup and the like and to easily provide an inter-subgroup communication.

Still alternatively, JP-A-2007-221592 (Abstract, paragraph 0001 etc.) proposes a group communication system so as to enable a communication within the same group in such a manner that each user exchanges a temporary number with each other without knowing the other party's basic contract number.

Still alternatively, JP-A-2005-38276 (Abstract, paragraph 0028 etc.) proposes to use a random number, a time of day, a user ID, and the like to issue a group ID and a password so as to issue a pair of a group ID and a passcode corresponding to this, which is not overlapped with one issued to the other registered groups when group communication is performed.

However, the group communication based on a method via the above described MCU and the like unfortunately lacks convenience since an originator specifies the phone numbers of all the group members and then makes a call, while later in order to perform a group intercommunication of the same members, the originator needs to specify the phone numbers of all the group members again from the very beginning in the same manner as before.

As a method for improving this point, it can be considered to make a call from a group phone book preliminarily registered by a group member. However, this method imposes a workload on the originator to access a server providing the service and then make a call.

The above described proposals in the patent documents have not reached the point of providing the user with convenience in that a group organization tailored to the original intention of a subscriber (user) wanting to perform a group communication is allowed, while the system side issues a representative number to the group, and after the issuance, the user can use the issued representative number to perform a group communication in substantially the same manner as in communicating with a single partner (subscriber).

In view of the above points, the present invention has been made, and an object of the present invention is to provide a group communication system, a group ID number issuing apparatus, and a call control apparatus capable of fully reflecting the intention of the user to a group communication in which a plurality of users perform communications at the same time, and after a group is organized based on the intention of the user, allowing the user to perform the group communication in simple operation in the same manner as an ordinary call.

SUMMARY OF THE INVENTION

In order to solve the above problems, the present application proposes the systems and apparatuses as listed below.

A group communication system according to a first aspect of the present invention is configured to include a group ID number issuing apparatus which issues a group ID number representing a group configured to include a plurality of subscribers selected at a user's discretion and commonly usable by an individual subscriber belonging to the group; and a call control apparatus which, when an incoming call to the group ID number, makes a call to a terminal device of an individual subscriber belonging to the group to enable intercommunication of all the terminal devices which responded to the call.

In the group communication system according to the above first aspect of the present invention, a group ID number issuing apparatus issues a group ID number such as a specific telephone number which represents the group configured to include a plurality of subscribers selected at a user's discretion and is commonly usable by an individual subscriber belonging to the group.

Further, when an incoming call to the group ID number occurs, a call control apparatus makes a call to a terminal device of an individual subscriber belonging to the group to enable intercommunication of all the terminal devices which responded to the call.

That is, once the above group ID number (e.g., a specific telephone number) is issued, subsequently the group ID number can be used in the same manner as an ordinary telephone number to perform group communication.

A group ID number issuing apparatus according to a second aspect of the present invention includes:

a group structure recognition section which recognizes a group configured to include a plurality of subscribers selected at a user's discretion; and a group ID number issuing section which issues a group ID number representing the group recognized by the group structure recognition section and commonly usable by an individual subscriber belonging to the group.

In the group ID number issuing apparatus according to the above second aspect of the present invention, the group configured to include a plurality of subscribers selected at a user's discretion, for example, from a cellular phone and other terminal device or a personal computer and the like is recognized by a group structure recognition section.

The group ID number issuing section issues a group ID number representing the group recognized by the group structure recognition section and commonly usable by an individual subscriber belonging to the group.

A user, namely, an individual subscriber can use the group ID number issued in this manner like an ordinary telephone number to perform group communication.

The group ID number issuing apparatus according to a third aspect of the present invention is characterized in that particularly in the group ID number issuing apparatus according to the above second aspect of the present invention, the group ID number issuing section issues, to the corresponding subscriber, a type-1 extended ID number having an individual identifier capable of identifying the plurality of individual subscribers in the group corresponding to the group ID number.

The group ID number issuing apparatus according to the above third aspect of the present invention issues, to a corresponding subscriber, a type-1 extended ID number having an individual identifier capable of identifying the plurality of individual subscribers in the group corresponding to the group ID number.

For this reason, an individual subscriber can be substantially identified by the type-1 extended ID number in a state in which the original ID number based on the subscription contract is not recognized.

The group ID number issuing apparatus according to a fourth aspect of the present invention is characterized in that particularly in the group ID number issuing apparatus according to the above second aspect of the present invention, the group ID number issuing section issues, to the corresponding subscriber belonging to an individual subgroup, a type-2 extended ID number having a subgroup identifier capable of identifying a subgroup located on the lower layer of the group corresponding to the group ID number.

The group ID number issuing apparatus according to the above fourth aspect of the present invention issues, to the corresponding subscriber belonging to the individual subgroup, a type-2 extended ID number having a subgroup identifier capable of identifying a subgroup located on the lower layer of the group corresponding to the group ID number.

This allows the group communication to be performed by the subscribers belonging to the subgroup limited within the group.

A call control apparatus according to a fifth aspect of the present invention is configured to include an incoming call notification section which recognizes and notifies of an incoming call to a group ID number representing a group configured to include a plurality of subscribers selected at a user's discretion and commonly usable by an individual subscriber belonging to the group; and a call control section which, when occurrence of an incoming call to the group ID number is notified of from the incoming call notification section, makes a call to a terminal device of an individual subscriber belonging to the group to enable intercommunication of all the terminal devices which responded to the call.

In the call control apparatus according to the above fifth aspect of the present invention, an incoming call notification section recognizes and notifies of an incoming call to a group ID number representing a group configured to include a plurality of subscribers selected at a user's discretion and commonly usable by an individual subscriber belonging to the group.

Further, when occurrence of an incoming call to the group ID number is notified of from the incoming call notification section, a call control section makes a call to a terminal device of an individual subscriber belonging to the group to enable intercommunication of all the terminal devices which responded to the call.

Therefore, the group ID number (e.g., a specific telephone number) can be used, as if an ordinary telephone is called, to perform group communication.

The call control apparatus according to a sixth aspect of the present invention is characterized in that particularly in the call control apparatus according to the above fifth aspect of the present invention, the incoming call notification section is further configured to be able to recognize that an incoming call to the type-1 extended ID number having an individual identifier capable of identifying the plurality of individual subscribers in the group corresponding to the group ID number occurs; and when occurrence of an incoming call to the type-1 extended ID number is notified of from the incoming call notification section, the call control section makes a call to the subscriber identified by the individual identifier.

In the call control apparatus according to the above sixth aspect of the present invention, when the incoming call notification section recognizes that an incoming call to the type-1 extended ID number having an individual identifier capable of identifying the plurality of individual subscribers in the group corresponding to the group ID number and notifies the call control section occurs, the call control section makes a call to the subscriber identified by the individual identifier.

The use of a type-1 extended ID number allows an individual subscriber to be substantially identified by the type-1 extended ID number and to specify a communication partner individually to make a call in a state in which the original ID number based on the subscription contract is not recognized.

The call control apparatus according to a seventh aspect of the present invention is characterized in that particularly in the call control apparatus according to the above fifth aspect of the present invention, the incoming call notification section is further configured to be able to recognize that an incoming call to the type-2 extended ID number having a subgroup identifier capable of identifying a subgroup located on the lower layer of the group corresponding to the group ID number occurs; and when occurrence of an incoming call to the type-2 extended ID number is notified of from the incoming call notification section, the call control section makes a call to a subscriber belonging to the subgroup identified by the subgroup identifier.

In the call control apparatus according to the above seventh aspect of the present invention, the incoming call notification section recognizes that an incoming call to the type-2 extended ID number having a subgroup identifier capable of identifying a subgroup located on the lower layer of the group corresponding to the group ID number occurs and notifies the call control section of the recognition.

When the notification is received, the call control section makes a call to a subscriber belonging to the subgroup identified by the subgroup identifier.

This allows the group communication to be performed by the subscribers belonging to the subgroup limited within the group.

The call control apparatus according to an eighth aspect of the present invention is characterized in that particularly in the call control apparatus according to the above fifth aspect of the present invention, the call control apparatus further comprises a calling condition recognition section which recognizes a calling condition related to a subscriber belonging to the group corresponding to the group ID number, and the call control section makes a call to a terminal device of the subscriber according to the calling condition recognized by the calling condition recognition section.

In the call control apparatus according to the above eighth aspect of the present invention, a calling condition recognition section recognizes the calling conditions such as the start time and the duration time of group communication or the conditions for the participating members.

The call control section makes a call to the terminal devices of the corresponding subscribers, for example, according to the calling conditions recognized by the calling condition recognition section.

Therefore, various application uses can be made depending on the settings of the calling conditions such that a telephone conference can be held starting at the planned start time for the planned duration time.

The call control apparatus according to a ninth aspect of the present invention is characterized in that particularly in the call control apparatus according to the above fifth aspect of the present invention, the call control apparatus further comprises a calling number notification mode recognition section which recognizes selection of a calling number notification mode of performing a calling number notification to a subscriber belonging to the group corresponding to the group ID number, and when the calling number notification mode recognition section recognizes that the calling number notification mode is selected, and when an incoming call to the group ID number occurs, the call control section makes a call with calling number notification to all the subscribers belonging to the group.

In the call control apparatus according to the above ninth aspect of the present invention, the calling number notification mode recognition section recognizes selection of a calling number notification mode of performing a calling number notification to a subscriber belonging to the group corresponding to the group ID number.

When the calling number notification mode recognition section has the recognition and when an incoming call to the group ID number occurs, the call control section makes a call with calling number notification to all the subscribers belonging to the group.

Therefore, the calling number notification matching the intention of the subscribers of the group is performed.

The call control apparatus according to a tenth aspect of the present invention is characterized in that particularly in the call control apparatus according to the above fifth aspect of the present invention, the call control apparatus further comprises a calling number non-notification mode recognition section which recognizes selection of a calling number non-notification mode without a calling number notification to the subscriber belonging to the group corresponding to the group ID number, and when the calling number non-notification mode recognition section recognizes that the calling number non-notification mode is selected, and when an incoming call to the group ID number occurs, the call control section makes a call with notification of the group ID number to all the subscribers belonging to the group.

In the call control apparatus according to the above tenth aspect of the present invention, a calling number non-notification mode recognition section recognizes selection of a calling number non-notification mode without a calling number notification to the subscriber belonging to the group corresponding to the group ID number.

When the calling number non-notification mode recognition section has the recognition, and when an incoming call to the group ID number occurs, the call control section makes a call with notification of the group ID number to all the subscribers belonging to the group.

Therefore, the calling number notification is not performed by reflecting the intention of calling number non-notification of the group subscriber originating the call. More specifically, the subscribers are notified of the group ID number instead of the calling number to allow the subscribers to understand the effect that the call is originated by any one of the subscribers belonging to the group.

The call control apparatus according to an eleventh aspect of the present invention is characterized in that particularly in the call control apparatus according to the above fifth aspect of the present invention, the call control apparatus further comprises a calling number notification type identification section which identifies whether the type-1 calling number notification mode of notifying the subscribers of the type-1 extended ID number having an individual identifier capable of identifying the plurality of individual subscribers in the group corresponding to the group ID number is selected or the type-2 calling number notification mode of notifying the subscribers of the group ID number is selected as the calling number notification to the subscriber belonging to the group corresponding to the group ID number, and the call control section makes a call with either notification of the type-1 extended ID number or the group ID number to the subscriber belonging to the group according to the calling number notification mode, whichever is recognized by the calling number notification type identification section.

In the call control apparatus according to the above eleventh aspect of the present invention, the calling number notification type identification section identifies whether the type-1 calling number notification mode of notifying the subscribers of the type-1 extended ID number having an individual identifier capable of identifying the individual subscribers is selected or the type-2 calling number notification mode of notifying the subscribers of the group ID number is selected, as the calling number notification.

According to the result identified by the calling number notification type identification section, the call control section makes a call with either notification of the type-1 extended ID number or the group ID number to the subscriber belonging to the group.

When a call with the type-1 extended ID number is made, the subscriber originating the call is identified; and when the type-2 calling number notification mode is selected, the recipient can recognize that the call was originated by any one of members belonging to the group containing the subscriber originating the call.

The call control apparatus according to a twelfth aspect of the present invention is characterized in that particularly in the call control apparatus according to the above fifth aspect of the present invention, the call control section notifies the subscriber who did not respond to the call, of the subscribers who responded to the call.

In the call control apparatus according to the above twelfth aspect of the present invention, the call control section notifies the subscriber who did not respond to the call, of the subscribers who responded to the call, and thus even the subscriber who did not respond to the call can understand the situations of the members who responded to the call and participated in the group communication.

The call control apparatus according to a thirteenth aspect of the present invention is characterized in that particularly in the call control apparatus according to the above fifth aspect of the present invention, when the intercommunication of the subscribers belonging to the group is performed via a predetermined MCU (Multi Point control Unit), and when an incoming call to the group ID number occurs, the call control section connects, to the MCU, the terminal device originating a call related to the incoming call.

In the call control apparatus according to a thirteenth aspect of the present invention, when the intercommunication of the subscribers belonging to the group is performed via a predetermined MCU (Multi Point control Unit), and when an incoming call to the group ID number occurs, the call control section connects, to the MCU, the terminal device originating a call related to the incoming call.

Therefore, the terminal device can participate in the group communication in the middle thereof via the MCU under the control of the call control apparatus.

The call control apparatus according to a fourteenth aspect of the present invention is characterized in that particularly in the call control apparatus according to the above fifth aspect of the present invention, when the intercommunication of the subscribers belonging to the group is performed via the predetermined MCU (Multi Point control Unit), and when the total number of terminal devices participating in the intercommunication of the subscribers decreases to two or less, the call control section switches the communication manner to the one not via the MCU.

In the call control apparatus according to the above fourteenth aspect of the present invention, even if communication is initially performed in the form of group communication via the predetermined MCU, the number of terminal devices may end up decreasing to two. In that case, the communication between the two parties has no advantage in using the MCU. Therefore, the communication manner can be switched to the one without using the MCU to effectively use finite communication resources.

The call control apparatus according to a fifteenth aspect of the present invention is characterized in that particularly in the call control apparatus according to the above fifth aspect of the present invention, regarding intercommunication of the terminal devices of the subscriber belonging to the group, of the terminal devices participating the intercommunication, the call control section controls the continuation of the communication of a remote network terminal device based on a subscription contract with another common carrier different from the common carrier operating a local communication network to which the call control apparatus belongs.

In the call control apparatus according to the above fifteenth aspect of the present invention, regarding intercommunication of the terminal devices of the subscriber belonging to the group, of the terminal devices participating the intercommunication, the call control section controls the continuation of the communication of a remote network terminal device, for example, by terminating the connection to the remote network terminal device based on a subscription contract with another common carrier different from the common carrier operating a local communication network to which the call control apparatus belongs.

Therefore, the common carrier operating a local communication network can reasonably avoid a risk such as charging failure which may occur when group communication benefit is extended to remote network devices.

The call control apparatus according to a sixteenth aspect of the present invention is characterized in that particularly in the call control apparatus according to the above fifth aspect of the present invention, the call control section further comprises a service manner specifying command receiving section which receives, from the corresponding terminal device, a service manner specifying command specifying a predetermined service, and the call control section is configured to execute the service according to the service manner specifying command received by the service manner specifying command receiving section.

In the call control apparatus according to the above sixteenth aspect of the present invention, the service manner specifying command receiving section receives a service manner specifying command specifying a predetermined service specified, for example, by a dedicated control signal and the like from the corresponding terminal device, and the call control section executes a service according to the received service manner specifying command.

For example, this opens the way for providing various services such as controlling the transfer to a so-called telephone answering service and preventing the message memo function from being activated in response to an incoming call from a group member.

The call control apparatus according to a seventeenth aspect of the present invention is characterized in that particularly in the call control apparatus according to the above fifth aspect of the present invention, the call control section further comprises an incoming call condition recognition section which recognizes an individual incoming call condition set to the individual subscriber, and the call control section executes a call to the terminal device of the individual subscriber in a manner based on the individual incoming call condition recognized by the incoming call condition recognition section.

In the call control apparatus according to the above seventeenth aspect of the present invention, an incoming call condition recognition section recognizes an individual incoming call condition set to the individual subscriber. The call control section executes a call to the terminal device of the individual subscriber in a manner based on the recognized individual incoming call condition.

Therefore, the call can be executed so as to sufficiently suit the desire of the individual subscribers and thus fine-grained services can be implemented.

A group ID number issuing apparatus according to an eighteenth aspect of the present invention is applied to a group communication system comprising a group ID number issuing apparatus which issues a group ID number commonly usable by an individual subscriber belonging to a predetermined group; and a call control apparatus which makes a call to the terminal device of the individual subscriber belonging to the group when an incoming call to the group ID number occurs, and enables intercommunication of all the terminal devices which responded to the call, wherein the group ID number issuing apparatus comprises a group structure recognition section which recognizes a group configured to include a plurality of subscribers selected by a common carrier operating the group communication system; and a group ID number issuing section which issues a group ID number representing the group recognized by the group structure recognition section and commonly usable by an individual subscriber belonging to the group.

In the group ID number issuing apparatus according to the eighteenth aspect of the present invention, the group can be organized and the group ID number corresponding to the group can be issued at the initiative of the common carrier side operating the group communication system.

The group ID number issuing apparatus according to a nineteenth aspect of the present invention is characterized in that particularly in the group ID number issuing apparatus according to the eighteenth aspect of the present invention, the group ID number issuing section issues, to the corresponding subscriber, a type-3 extended ID number having an individual identifier capable of identifying the plurality of individual subscribers in the group corresponding to the group ID number.

In the group ID number issuing apparatus according to the above nineteenth aspect of the present invention, the individual identifier capable of identifying the plurality of individual subscribers in the corresponding group can also be issued at the initiative of the common carrier side operating the group communication system.

The group ID number issuing apparatus according to a twentieth aspect of the present invention is characterized in that particularly in the group ID number issuing apparatus according to the eighteenth aspect of the present invention, the group ID number issuing section issues, to the corresponding subscriber belonging to the individual subgroup, a type-4 extended ID number having a subgroup identifier capable of identifying a subgroup located on the lower layer of the group corresponding to the group ID number.

In the group ID number issuing apparatus according to the above twentieth aspect of the present invention, the subgroup identifier capable of identifying a subgroup located on the lower layer of the group corresponding to the group ID number can also be issued at the initiative of the common carrier side operating the group communication system.

The present invention provides the group communication system, the group ID number issuing apparatus, and the call control apparatus capable of fully reflecting the intention of the user to a group communication, and after a group is organized based on the intention of the user, allowing the user to perform the group communication in the same simple operation as an ordinary call.

BRIEF DESCRIPTION OF THE DRAWINGS

FIG. 4 schematically illustrates an operation of the group ID number issuing apparatus to issue a type-1 extended ID number;

FIG. 5 schematically illustrates how group-common phone numbers are registered, with a code indicating whether or not to join a group communication for each individual subscriber, in the group ID number issuing apparatus;

DETAILED DESCRIPTION OF THE PREFERRED EMBODIMENTS

Hereinafter, the present invention will be clarified with reference to the drawings by describing the embodiments of the present invention in detail.

(Outline of the Group Communication System of the Present Invention)

Figure 1:
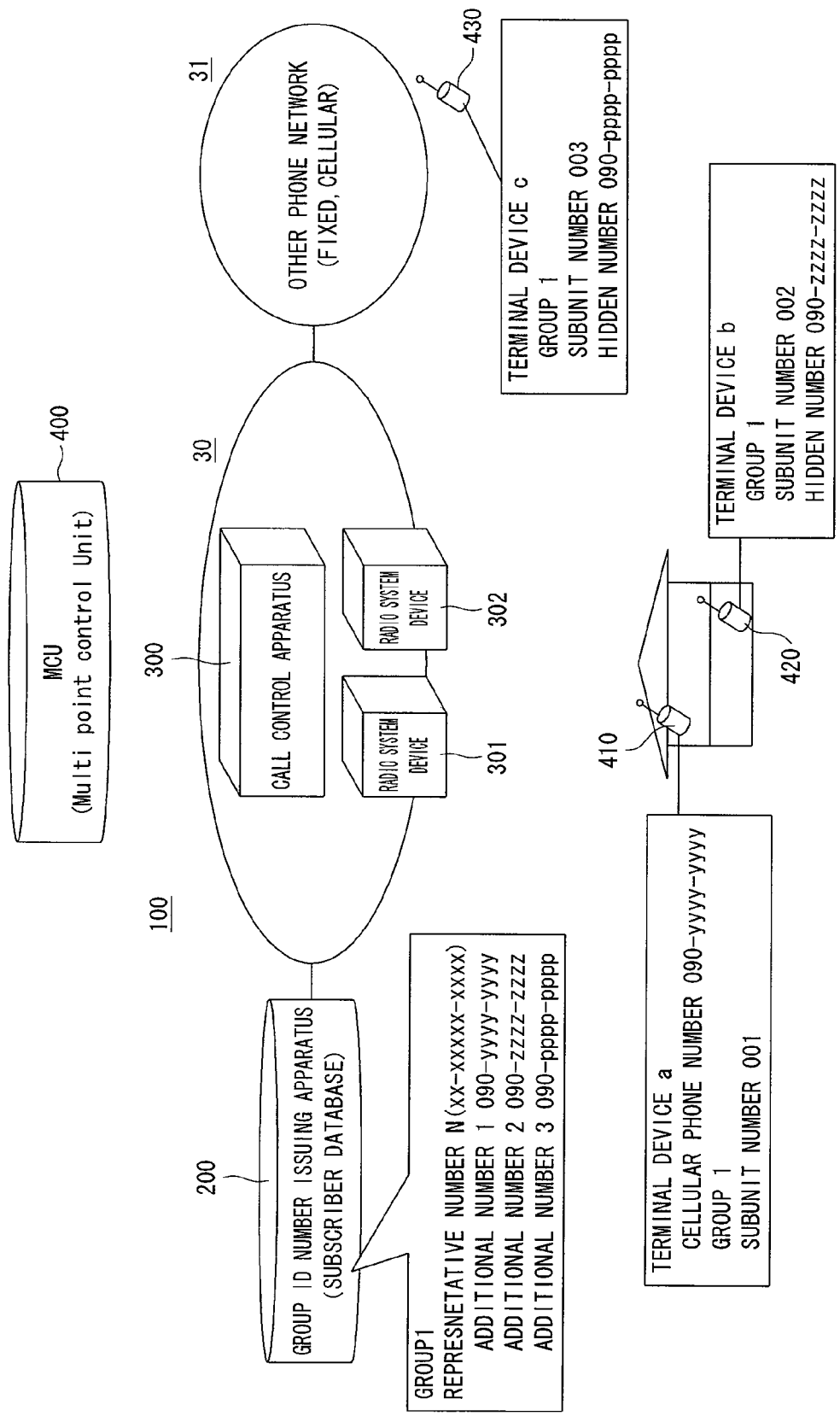
FIG. 1 is a schematic drawing illustrating a configuration of a group communication system including a group ID number issuing apparatus and a call control apparatus as an embodiment of the present invention.

FIG. 1 is a schematic drawing illustrating a configuration of a group communication system including a group ID number issuing apparatus and a call control apparatus as an embodiment of the present invention.

With reference to FIG. 1, a group communication system 100 as an embodiment of the present invention is configured to include a group ID number issuing apparatus 200 and a call control apparatus 300.

The group ID number issuing apparatus 200 allows a user to use a terminal device such as a cellular phone and a personal computer to access the terminal device and set a group by a plurality of arbitrarily selected members (subscribers).

The group ID number issuing apparatus 200 issues, to a group organized based on the intention of the user in this manner, a group ID number representing the group and commonly usable by an individual subscriber belonging to the group.

In response to an incoming call corresponding to the group ID number issued by the group ID number issuing apparatus 200, the call control apparatus 300 makes a call to the terminal devices (e.g., cellular phones) of the individual subscribers belonging to the group represented by the group ID number and sets a call so as to enable intercommunication of all the terminal devices which responded to the call.

When the above call is set, the call control apparatus 300 of the present embodiment makes a connection via an MCU (Multi Point control Unit) 400 according to the conditions for performing a group communication such as the number of subscribers (terminal devices), namely, the parties involved in communication as described in detail later. It should be noted that according to the group communication system 100 of the present embodiment, a well known device may be used as the MCU 400.

The call control apparatus 300 includes a plurality of radio system devices 301, 302, and the like such as a base station, a base station control apparatus thereunder, and the like, which forms a communication network (telephone network) 30 operated by a common carrier.

For convenience of description, FIG. 1 illustrates a terminal device 410 (hereinafter, as needed, referred to as a terminal device a) and a terminal device 420 (hereinafter, as needed, referred to as a terminal device b) of the subscriber entering into a subscription contract with the common carrier operating the communication network 30.

In addition to the communication network 30, another communication network (fixed or mobile telephone network) 31 operated by another common carrier is formed and a terminal device 430 (hereinafter, as needed, referred to as a terminal device c) of the subscriber entering into a subscription contract with the common carrier operating the communication network 31 is illustrated.

(Configuration of the Group ID Number Issuing Apparatus of the Present Invention)

Figure 2:
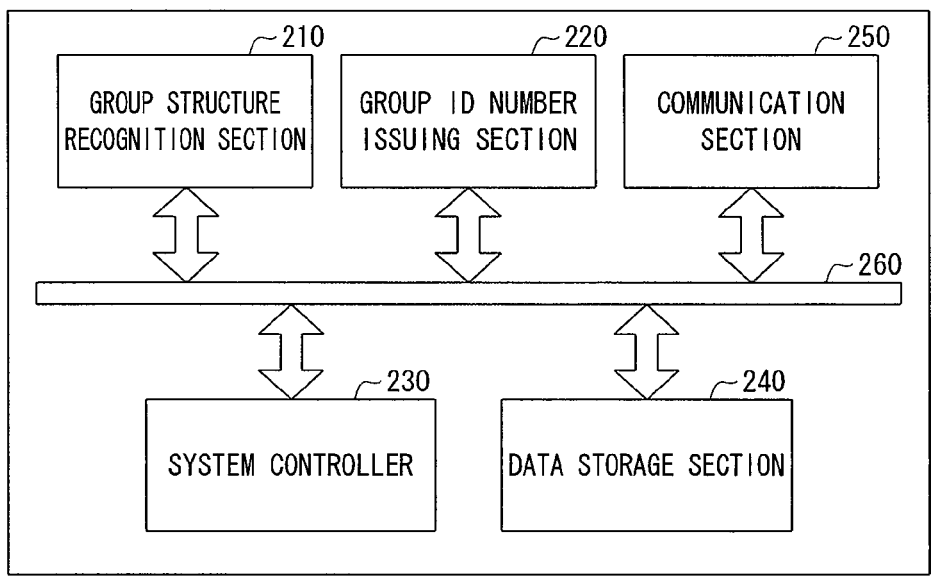
FIG. 2 is a block diagram illustrating a configuration of a group ID number issuing apparatus as an embodiment of the present invention.

FIG. 2 is a block diagram illustrating a configuration of a group ID number issuing apparatus as an embodiment of the present invention.

The group ID number issuing apparatus 200 is configured using a bus 260 to connect a group structure recognition section 210, a group ID number issuing section 220, a system controller 230, a data storage section 240, and a communication section 250.

The group structure recognition section 210 recognizes a group organized by members (subscribers) which the user uses a terminal device such as a cellular phone and a personal computer to arbitrarily set as already described with reference to FIG. 1.

The group ID number issuing section 220 issues a group ID number representing the group recognized by the group structure recognition section 210 and commonly usable by an individual subscriber belonging to the group. It should be noted that the group ID number may be a specific telephone number.

For example, the system controller 230 is configured mainly by a CPU and performs overall management of the above described individual sections connected via the bus 260.

The already described group structure recognition section 210 and the group ID number issuing section 220 primarily function respectively under the control of the system controller 230 as well.

The data storage section 240 is configured to include a large-capacity storage device, in which a subscriber database is built and maintained so as to store various kinds of information such as the contract of the subscriber, the specifications of the terminal device, position information thereof, and other so-called subscriber information, namely, information about the individual subscriber.

The communication section 250 performs a communication process under the control of the system controller 230 to allow the group ID number issuing apparatus 200 to send and receive information to and from outside.

In the above configuration, the group ID number issuing section 220 can function under the control of the system controller 230 so as to refer to data stored in the data storage section 240 as needed, and issue, to the corresponding subscriber, a type-1 extended ID number having an individual identifier capable of identifying a plurality of individual subscribers in the group corresponding to the group ID number which is, for example, a telephone number as already described.

The group ID number issuing apparatus 200 in FIG. 1 schematically illustrates the above description.

More specifically, an organized and registered group (group 1) is assigned with "representative number N" as the group ID number (N is actually XX-XXXXX-XXXX). The group 1 has three individual subscribers (three terminal devices) which can be individually identified by individual identifiers: "additional number 1", "additional number 2", and "additional number 3", each of which is added to the "representative number N" respectively.

In this case, the contract telephone number of the terminal device "additional number 1" is 090-yyyy-yyyy, the contract telephone number of the terminal device "additional number 2" is 090-zzzz-zzzz, and the contract telephone number of the terminal device "additional number 3" is 090-pppp-pppp.

These illustrated individual contract numbers are not recognized by the parties involved in the group communication system in accordance with the present invention, and thus with these contract numbers hidden sort of backside, the parties involved can enjoy the group communication service.

Therefore, for the description of the present invention, the individual contract number is referred to as the "hidden number", as needed.

(Configuration of the Call Control Apparatus of the Present Invention)

Figure 3:
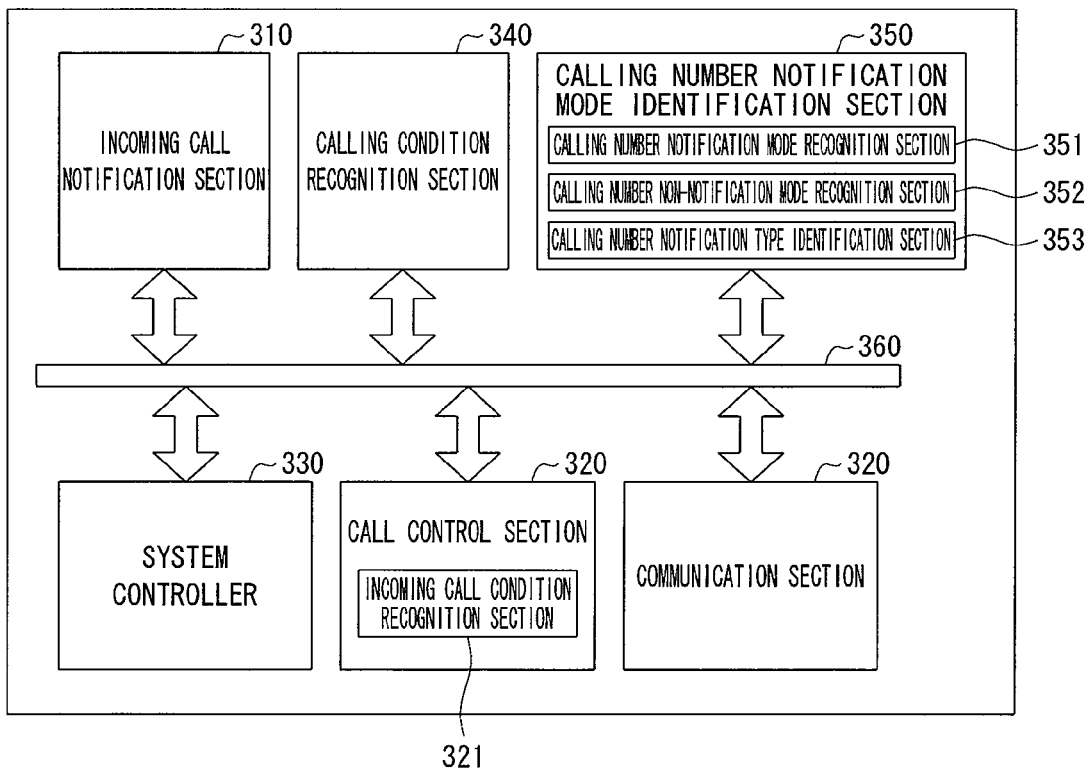
FIG. 3 is a block diagram illustrating a configuration of a call control apparatus as an embodiment of the present invention.

FIG. 3 is a block diagram illustrating a configuration of the call control apparatus 300 as an embodiment of the present invention.

The call control apparatus 300 is configured using a bus 360 to connect an incoming call notification section 310, a call control section 320, a system controller 330, a calling condition recognition section 340, and a calling number notification mode identification section 350.

The incoming call notification section 310 recognizes an incoming call to the already described group ID number (telephone number) and notifies the call control section 320.

When the call control section 320 is notified of an incoming call to the group ID number from the incoming call notification section 310, the call control section 320 makes a call to the terminal devices of the individual subscribers belonging to the group of the group ID number, and enables intercommunication of all the terminal devices which responded to the call.

For example, the system controller 330 is configured mainly by a CPU and performs overall management of the above described individual sections connected via the bus 360.

The already described incoming call notification section 310 and the call control section 320 primarily function respectively under the control of the system controller 330 as well.

For example, the calling condition recognition section 340 recognizes the start time and the duration time of group communication or the calling conditions such as the participating members; and the call control section 320 makes a call to the terminal devices of the corresponding subscribers according to these calling conditions recognized by the calling condition recognition section 340.

Therefore, various application uses can be made depending on the settings of the calling conditions such that a telephone conference can be held starting at the planned start time for the planned duration time.

The calling number notification mode identification section 350 of the call control apparatus 300 in accordance with the present embodiment is configured to include a calling number notification mode recognition section 351, a calling number non-notification mode recognition section 352, and a calling number notification type identification section 353.

The calling number notification mode identification section 350 recognizes that the calling number notification mode is selected to perform calling number notification to the subscribers belonging to the group corresponding to the group ID number.

When the recognition is made by the calling number notification mode recognition section 351 of the calling number notification mode identification section 350, and an incoming call to the group ID number occurs, the call control section 320 makes a call with calling number notification to all the subscribers belonging to the group.

The calling number notification mode itself can be selected in advance by reflecting the intention of all the subscribers belonging to the group. Therefore, the calling number notification matching the intention of the subscribers of the group is performed.

The calling number non-notification mode recognition section 352 recognizes that the calling number non-notification mode without calling number notification to the subscribers belonging to the group corresponding to the group ID number is selected.

When the recognition is made by the calling number non-notification mode recognition section 352 of the calling number notification mode identification section 350, and an incoming call to the group ID number occurs, the call control section 320 makes a call with the group ID number notification to all the subscribers belonging to the group.

The calling number non-notification mode itself can be selected in advance by reflecting the intention of the subscribers belonging to the group. Therefore, the calling number notification is not performed by reflecting the intention of the subscribers of the group. More specifically, the subscribers are notified of the group ID number instead of the calling number to allow the subscribers to understand the effect that the call is originated by any one of the subscribers belonging to the group.

The calling number notification type identification section 353 identifies whether the type-1 calling number notification mode of notifying the subscribers of the type-1 extended ID numbers to which the individual identifiers (e.g., already described additional numbers) capable of identifying the individual subscribers are appended is selected or the type-2 calling number notification mode (described later) of notifying the subscribers of the group ID number is selected, as the calling number notification.

According to the results identified by the calling number notification type identification section 353, the call control section 320 makes a call to the subscribers belonging to the group with the type-1 extended ID number or the group ID number.

When a call with the type-1 extended ID number is made, the subscriber originating the call is identified; and when the type-2 calling number notification mode is selected, the recipient can recognize that the call was originated by any one of members belonging to the group containing the subscriber originating the call.

It should be noted that according to the call control apparatus 300 in accordance with the present embodiment, the call control section 320 is configured to notify the subscriber who did not respond to the call, of the subscribers who responded to the call.

For this reason, even the subscriber who did not respond to the call can understand the situations such as who was the member who responded to the call and participated in the group communication.

The call control section 320 includes an incoming call condition recognition section 321. The incoming call condition recognition section 321 recognizes the individual incoming call conditions set with respect to each subscriber.

The call control section 320 executes a call to the terminal devices of the individual subscribers in a manner according to the recognized individual incoming call conditions.

Therefore, the call can be executed so as to sufficiently suit the desire of the individual subscribers and thus fine-grained services can be implemented.

(Issuing the Type-1 Extended ID Number)

FIG. 4 schematically illustrates how the group ID number issuing apparatus 200 issues the type-1 extended ID number which is a sort of extended group ID number further appending an additional code capable of identifying the individual subscriber to the group ID number commonly usable by the individual subscribers representing the group and belonging to the group as already described.

In this example, the representative number of the group 1 is N (xx-xxxxx-xxxx), the individual subscribers (terminal devices) belonging to the group can be identified by the additional code such as the additional numbers 1 to 3 (identifiers 001 to 003).

The Figure illustrates how the already described "hidden number" corresponds to the individual terminal device.

A group representative telephone number and an identifier can be used instead of a subscriber's telephone number to identify the calling party and make a call thereto.

In this case, while the "hidden number" which is the original telephone number is hidden, a telephone call can be made without posing any problem for intercommunication.

(Subgroup Setting and Type-2 Extended ID Number)

FIG. 5 schematically illustrates how "ON" or "OFF" is selected and registered as a code indicating whether or not to join group communication for each subscriber (terminal device) in the group ID number issuing apparatus 200.

In the Figure, the selected one of the "ON" and "OFF" is encircled with an oval to be indicated. In this case, "ON" indicates "participate in group communication" and "OFF" indicates "not participate in group communication" respectively.

The above described "ON" or "OFF" may be selected and registered in advance based on the intention of the individual subscriber. In this case, the intention of the individual subscriber is faithfully reflected and thus the group communication limited to the subscribers essentially wanting to perform group communication can be performed.

Alternatively, "ON" or "OFF" may be selected and registered based on the intention of a subscriber who is the originator of the group communication. In this case, the individual subscriber takes a passive stance regarding the intention of the originator of the group communication, but can be relieved from performing complicated operation of selecting one of "ON" and "OFF" and registering it in the group ID number issuing apparatus 200 by themselves as described above.

As described above, regarding a group involved in group communication, in the above listed example, additional codes such as "ON" and "OFF" can be used as the subgroup identifier capable of identifying the subgroup located on the lower layer of the group corresponding to the group ID number.

More specifically, in this example, the group is divided into a subgroup to which "ON" is appended to participate in the group communication, and a subgroup to which "OFF" is appended not to participate in the group communication.

The incoming call notification section 310 of the call control apparatus 300 is configured to be able to recognize that an incoming call occurs to the type-2 extended ID number to which such a subgroup identifier as illustrated above is appended. When the call control section 320 is notified from the incoming call notification section 310 that an incoming call to the type-2 extended ID number occurs, the call control section 320 makes a call to the subscribers belonging to the subgroup identified by the subgroup identifier.

This allows the group communication to be performed by the subscribers belonging to the subgroup limited within the group.

(Call Control Operation of the Call Control Apparatus of the Present Invention)

Figure 6:
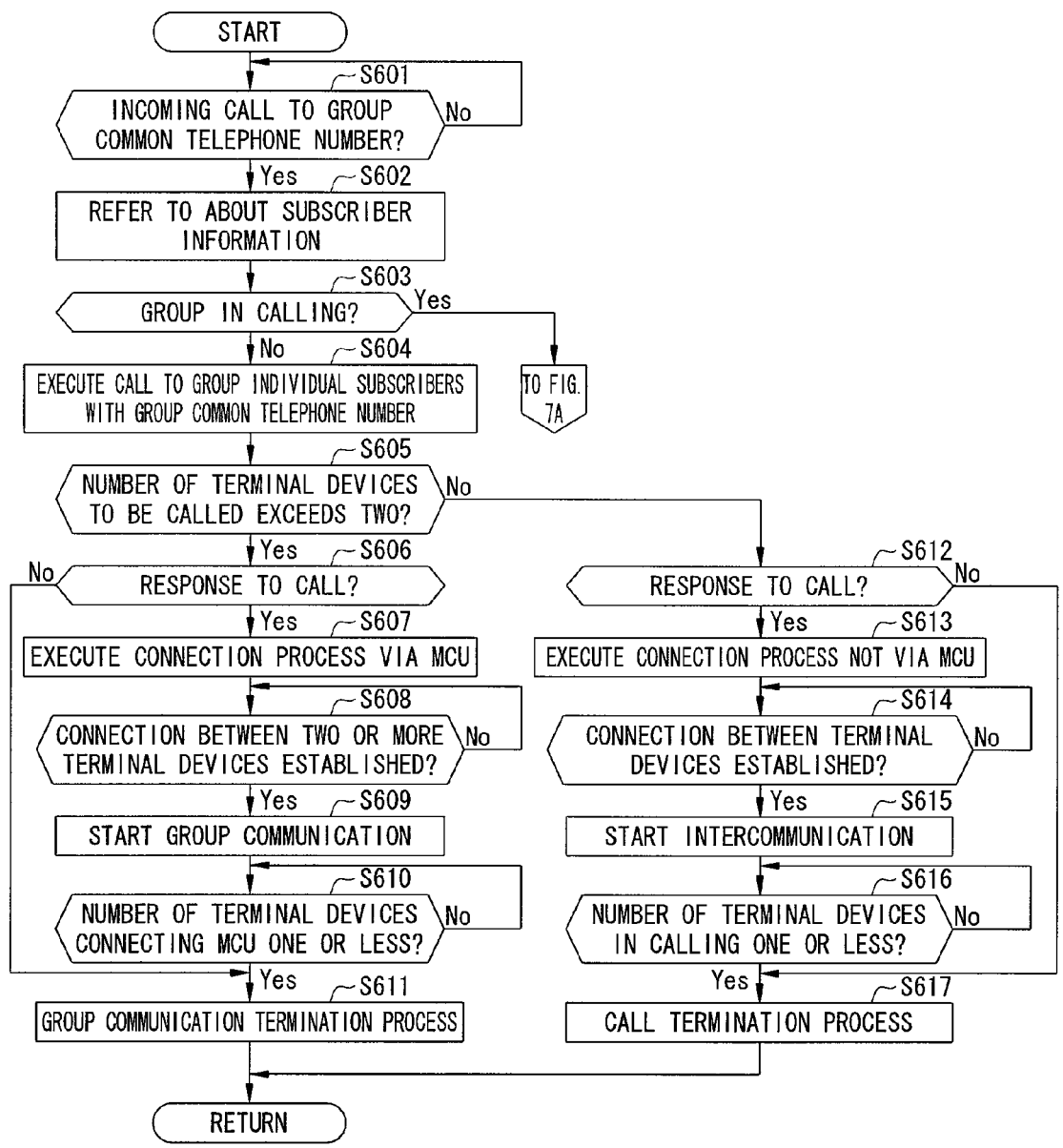
FIG. 6 is a flowchart showing a call control operation of the call control apparatus of the present invention in a group communication.

FIG. 6 is a flowchart showing a call control operation of the call control apparatus 300 of the present invention.

After the operation starts, the call control apparatus 300 waits until an incoming call to a group common telephone number occurs (Step S601: No). When an incoming call occurs (Step S601: Yes), reference is made to the group ID number issuing apparatus 200, which has a database of the subscriber as already described, about subscriber information on the corresponding subscriber (Step S602).

Then, a determination is made as to whether the corresponding group is in calling or not (Step S603). If not in calling (Step S603: No), a call is executed to the individual subscribers (terminal devices) of the group with a group common telephone number (Step S604).

According to the present embodiment, following the call in Step S604, a determination is made as to whether the number of terminal devices to be called exceeds two or not (Step S605).

If a determination is made in Step S605 that the number of terminal devices to be called exceeds two (Step S605: Yes), a determination is further made as to whether or not there is a response to the call (Step S606).

If a determination is made in Step S606 that there is a response (Step S606: Yes), a call setting process via the MCU (FIG. 1: 400) is executed (Step S607).

Following the call setting in Step S607, a wait is made until a connection is established between the two or more terminal devices (Step S608: No). When the wait period is elapsed (Step S608: Yes), which means reaching a state capable of performing intercommunication, group communication is started (Step S609).

Following Step S609, group communication is performed between subscriber terminal devices exceeding two, but subsequently, the subscribers who participated in the group communication from the beginning may terminate a call one by one, or all the subscribers may terminate the calls at the same time.

In this manner, the number of terminal devices connected to the MCU and maintaining the call so as to continue the group communication may gradually decrease. Then, monitoring is performed until the number of terminal devices is one or less which means that there is no calling partner and thus communication cannot be established (Step S610: No). When a determination is made that the number of terminal devices is one or less (Step S610: Yes), the group communication is terminated (Step S611).

When there is no response to the call in the above Step S606 (Step S606: No), the process jumps to Step S611 to terminate the process.

On the one hand, in the above Step S605, a determination is made that the number of terminal devices to be called is two or less (Step S605: No), a determination is made as to whether or not there is a response to the call (Step S612).

If a determination is made in Step S612 that there is a response (Step S612: Yes), a call setting process not via the MCU (FIG. 1: 400) is executed (Step S613).

Following the call setting in Step S613, a wait is made until a connection is established between the two or more terminal devices (Step S614: No). When the wait period is elapsed (Step S614: Yes), intercommunication is started (Step S615).

Following Step S615, monitoring is performed until the number of terminal devices connected to each other and maintaining the call so as to continue communication is one or less which means that there is no calling partner and thus communication cannot be established (Step S616: No). When a determination is made that the number of terminal devices is one or less (Step S616: Yes), the intercommunication is terminated (Step S617).

On the other hand, when a determination is made in the above Step S603 that the group is in calling (Step S603: Yes), the process goes to the process of FIG. 7 described later.

Figure 7:
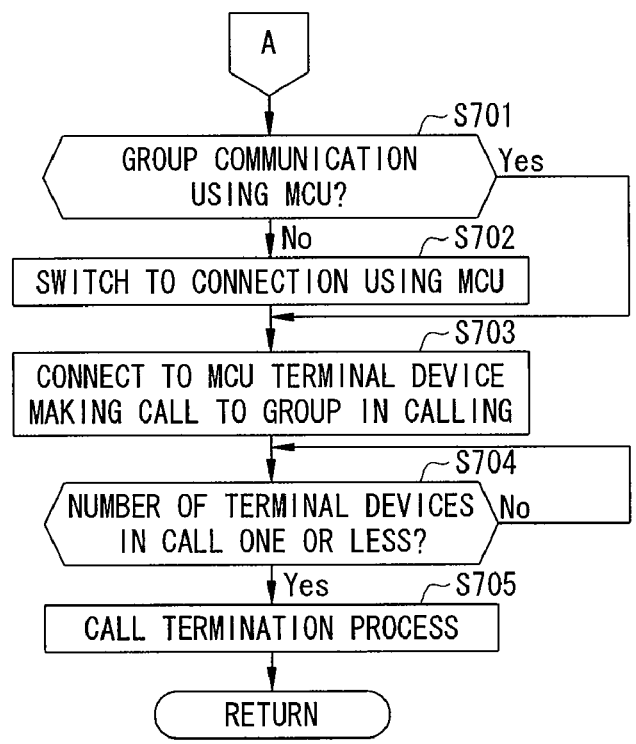
FIG. 7 is a flowchart continuing from the flowchart of FIG. 6.

When the process goes to the process of FIG. 7, a determination is made as to whether or not the state in calling is a group communication using the MCU (Step S701).

When a determination is made in Step S701 that the group communication is not via the MCU (Step S701: No), the connection is switched to the connection via the MCU (Step S702).

Then, the terminal device making a call to the group in group communication (i.e., in calling as a group) is connected to the MCU to allow the terminal device to participate in the group communication in the middle thereof (Step S703).

It should be noted that when a determination is made in the above Step S701 that the group is connected via the MCU (Step S701: Yes), the process jumps to this Step S703.

Following Step S703, as already described in Step S610 of FIG. 6, monitoring is performed until the number of terminal devices connected to the MCU and maintaining the call so as to continue group communication gradually decreases to one or less which means that there is no calling partner and thus communication cannot be established (Step S704: No). When a determination is made that the number of terminal devices is one or less (Step S704: Yes), the group communication is terminated (Step S705).

As described above with reference to the flowcharts of FIGS. 6 and 7, according to the present embodiment of the present invention, while the subscribers belonging to the group are performing communication via predetermined MCU (Multi Point control Unit), and when incoming call to the group ID number occurs, the call control section 320 connects, to the MCU, the terminal device making a call related to the incoming call.

Therefore, the terminal device can participate in the group communication in the middle thereof via the MCU under the control of the call control apparatus 300.

Even if communication is initially performed in the form of group communication via a predetermined MCU, the number of terminal device may end up decreasing to two. In that case, the communication between the two parties has no advantage in using the MCU. Therefore, the communication manner can be switched to the one without using the MCU to effectively use finite communication resources.

Figure 8:
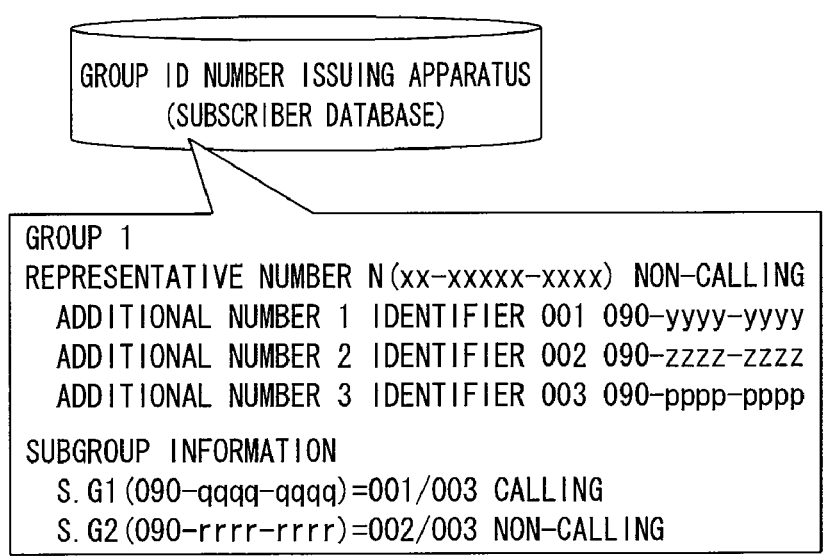
FIG. 8 illustrates how calling/no-calling is managed for each group-common telephone number or subgroup.

As described above, when an incoming call to the group common telephone number occurs, management is performed on the group common telephone number to determine whether to be calling or no-calling as illustrated in FIG. 8, and further, such a management may be performed for each subgroup defined below the group and denoted by such as "S.G 1" and "S.G 2" illustrated in the Figure.

(Another Embodiment of the Call Control Apparatus of the Present Invention)

Figure 9:
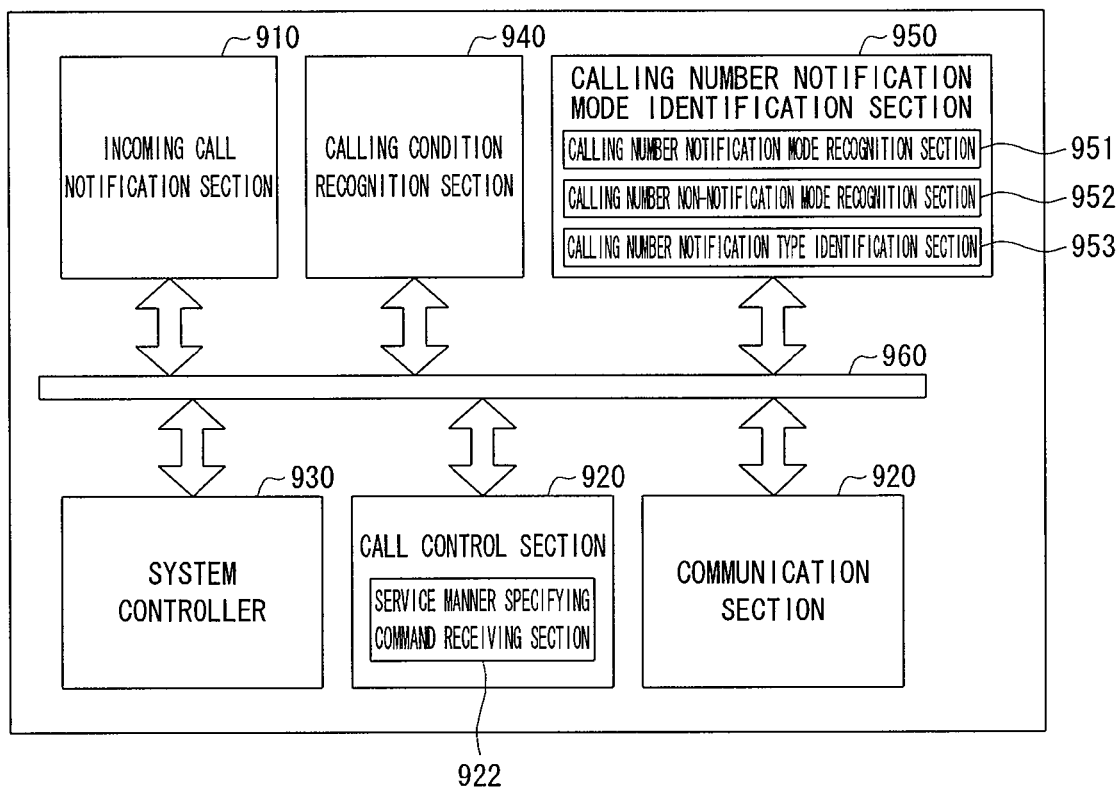
FIG. 9 is a block diagram illustrating another embodiment of the call control apparatus in accordance with the present invention.

FIG. 9 is a block diagram illustrating another embodiment of the call control apparatus in accordance with the present invention. The call control apparatus 900 of FIG. 9 has an identical or similar configuration in many parts of the call control apparatus 300 already described with reference to FIG. 3. Therefore, the elements having reference numbers 900-999 have the same last two digits as the elements having reference numbers 300-399 in FIG. 3.

More specifically, the call control apparatus 900 is configured using a bus 960 to connect an incoming call notification section 910, a call control section 920, a system controller 930, a calling condition recognition section 940, and a calling number notification mode identification section 950.

Of these elements, the incoming call notification section 910, the system controller 930, the calling condition recognition section 940, and the calling number notification mode identification section 950 have substantially the same configuration as the incoming call notification section 310, the system controller 330, the calling condition recognition section 340, and the calling number notification mode identification section 350 as already described.

However, the call control apparatus 900 is different from the call control apparatus 300 of FIG. 3 in that the call control section 920 has a service manner specifying command receiving section 922.

The service manner specifying command receiving section 922 of the call control section 920 receives a service manner specifying command specifying a predetermined service specified, for example, by a dedicated control signal and the like from the corresponding terminal device.

The call control section 922 executes a service according to the received service manner specifying command.

The call control section 922 functions in this manner to open the way for providing various services such as controlling the transfer to a so-called telephone answering service and preventing the message memo function from being activated in response to an incoming call from a group member.

(Still Another Embodiment of Call Control Apparatus of the Present Invention)

Figure 10:
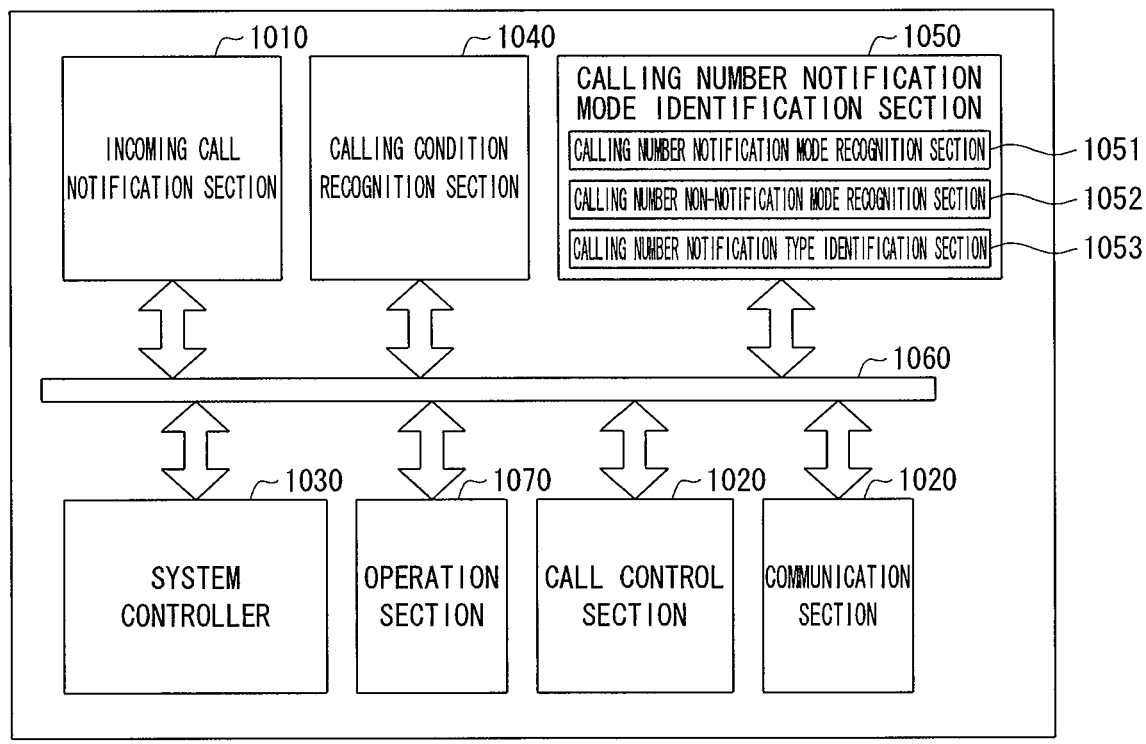
FIG. 10 is a block diagram illustrating still another embodiment of the call control apparatus in accordance with the present invention.

FIG. 10 is a block diagram illustrating still another embodiment of the call control apparatus in accordance with the present invention. The call control apparatus 1000 of FIG. 10 has an identical or similar configuration in many parts of the call control apparatus 300 already described with reference to FIG. 3. Therefore, the elements having reference numbers 1000-1999 have the same last two digits as the elements having reference numbers 300-399 in FIG. 3.

More specifically, the call control apparatus 1000 is configured using a bus 960 to connect an incoming call notification section 1010, a call control section 1020, a system controller 1030, a calling condition recognition section 1040, and a calling number notification mode identification section 1050.

The incoming call notification section 1010, the call control section 1020, the system controller 1030, the calling condition recognition section 1040, and the calling number notification mode identification section 1050 have substantially the same configuration as the incoming call notification section 310, the call control section 320, the system controller 330, the calling condition recognition section 340, and the calling number notification mode identification section 350 as already described.

However, the call control apparatus 1000 is different from the call control apparatus 300 of FIG. 3 in that the call control apparatus 1000 has an operation section 1070 which accepts an arbitrary operation of a common carrier.

More specifically, the call control apparatus 1000 uses the operation section 1070 to organize a group and issue a group ID number corresponding to the group at the initiative of the common carrier side operating the group communication system.

Therefore, the users are usably presented with various groups organized at the initiative of the common carrier side so as to select a presented group to enjoy a group communication service.

In addition, another extended ID number pursuant to the type-1 extended ID number and the type-2 extended ID number in accordance with the already described embodiments can also be issued at the initiative of the common carrier side.

For example, at the initiative of the common carrier side, a type-3 extended ID number having an individual identifier capable of identifying a plurality of individual subscribers in the group corresponding to the group ID number can be issued to the corresponding subscriber from the group ID number issuing section of the group ID number issuing apparatus.

In this case, the individual identifier capable of identifying a plurality of individual subscribers in the corresponding group can also be issued at the initiative of the common carrier side operating the group communication system.

Further, at the initiative of the common carrier side, the group ID number issuing section of the group ID number issuing apparatus can issue, to the subscriber belonging to the individual subgroup, a type-4 extended ID number having a subgroup identifier capable of identifying a subgroup located on the lower layer of the group corresponding to the group ID number.

In this case, the subgroup identifier capable of identifying a subgroup located on the lower layer of the group corresponding to the group ID number can also be issued at the initiative of the common carrier side operating the group communication system.

Figure 11:
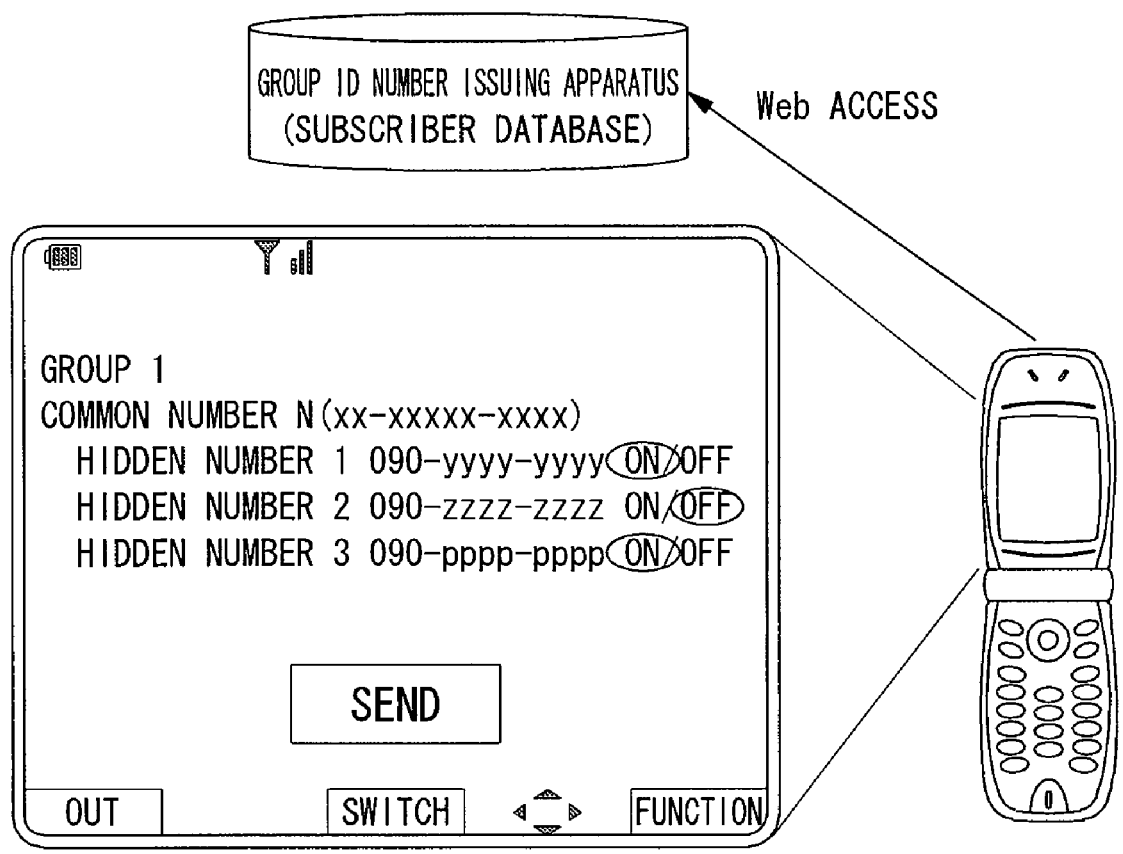
FIG. 11 illustrates how information is displayed on the terminal device when a group presented by a common carrier side is selected to initiate a group communication service.

FIG. 11 illustrates how information is displayed on the terminal device when a group presented by the common carrier side is selected to initiate a group communication service.

When the group displayed in the Figure is selected and "Send" button is operated, the same group communication as that by the already described group set at the initiative of the users is performed.

Figure 12:
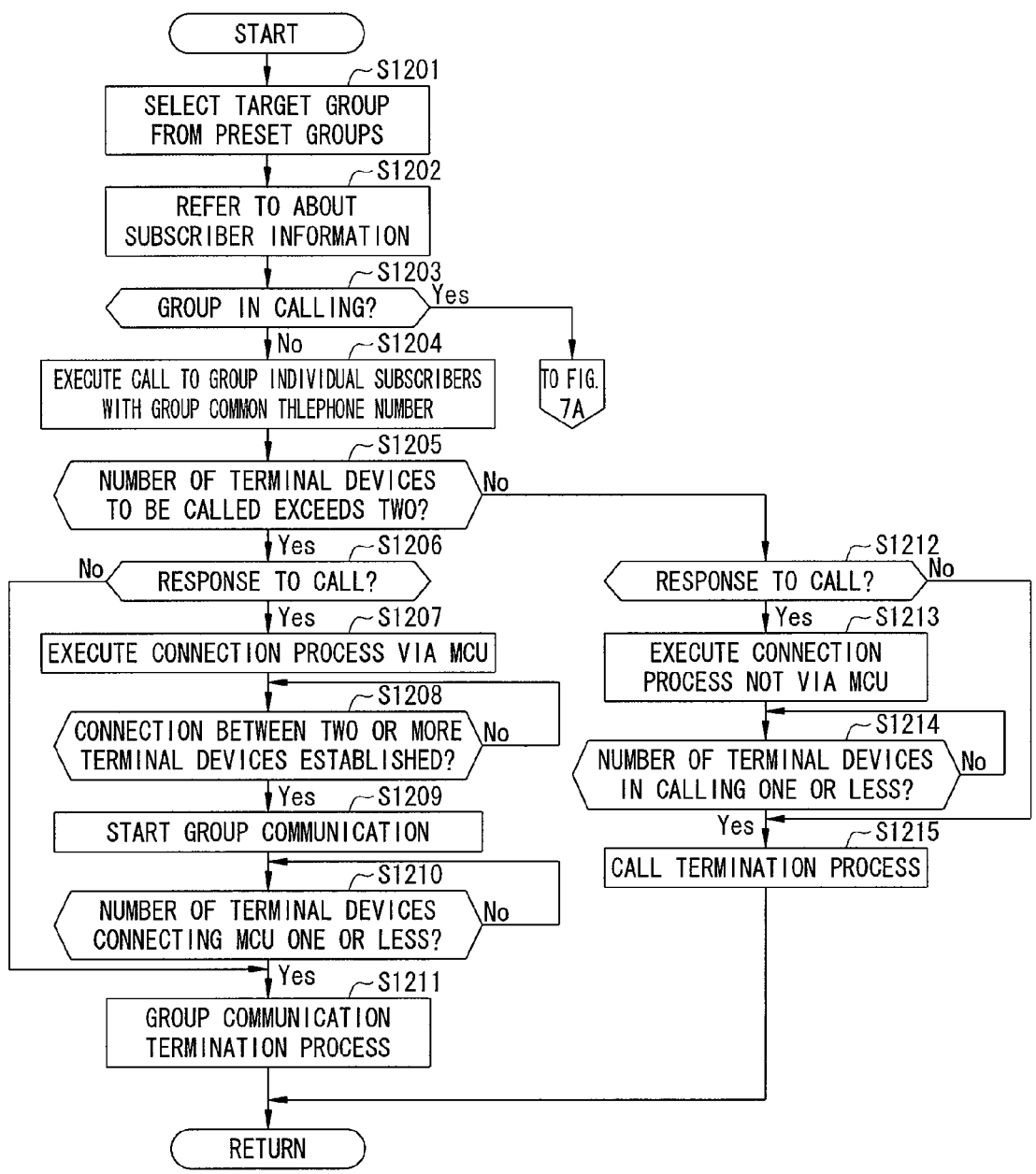
FIG. 12 is a flowchart illustrating a call control operation of the call control apparatus in accordance with yet another embodiment in a group communication.

FIG. 12 is a flowchart illustrating an operation of the group communication when a group presented by the common carrier side is selected to initiate the group communication service.

The individual steps in FIG. 12 are identical or similar to those in FIG. 6 as already described. The individual steps having reference numbers 1200-1299 have the same last two digits as the reference numbers 600-699 in FIG. 6, and the description of the individual steps is omitted.

With reference to the process steps in FIGS. 12 and 6, the difference between them will be described. On the one hand, in Step S601 of FIG. 6, a wait is made until an incoming call to a group common telephone number related to the group organized based on the intention of the users occurs (Step S601: No). When an incoming call occurs (Step S601: Yes), group communication is started through following several process steps. On the other hand, in Step S1201 of FIG. 12, a group presented from the common carrier side is selected and the "send" button is operated as illustrated in FIG. 11. Then, a group communication service is started through following several process steps.

The other process steps are the same as those in FIG. 6.

The present invention can be effectively used to build a group communication system allowing group communication to be performed by a simple operation and provide a group ID number issuing apparatus and a call control apparatus to be applied to such a group communication system.

What is claimed is:

1. A group communication system comprising:
   a group ID number issuing apparatus for issuing a group ID number representing a group configured to include a plurality of subscribers selected at a subscriber and commonly used by any one of the plurality of subscribers belonging to the group; and
   a call control apparatus for, when there is an incoming call to the group ID number, making a call to terminal devices of the plurality of subscribers belonging to the group to enable intercommunication of all the terminal devices belonging to the group that have responded to the incoming call;
   wherein the call control apparatus comprises:
      an incoming call notification section for recognizing the incoming call and notifying the incoming call for the group ID number to the plurality of subscribers belonging to the group;
      a call control section for, when generation of the incoming call for the group ID number is notified from the incoming call notification section, making a call to the all of the terminal devices that have responded to the incoming call to enable intercommunication of the all of the terminal devices which have responded to the call; and
      a calling number notification mode identification section for identifying a selection of a calling number notification mode of notifying a calling number to the plurality of subscribers belonging to the group, or a calling number non-notification mode of not notifying the calling number to the plurality of subscribers belonging to the group;
   wherein the calling number notification mode identification section comprises:
      a calling number notification mode recognition section for recognizing the selection of the calling number notification mode, and making a call with the calling number notified to the plurality of subscribers belonging to the group;
      a calling number non-notification mode recognition section for recognizing the selection of the calling number non-notification mode without notifying the calling number to the plurality of subscribers belonging to the group; and
      a calling number notification type identification section for identifying a calling number notification type whether a type-1 calling number notification of notifying a type-1 extended ID number having an individual identifier capable of identifying each of the plurality of subscribers is selected or a type-2 calling number notification of notifying the subscribers of the group ID number is selected;
   wherein the call control section makes a call with either the type-1 calling number notification or the type-2 calling number notification to the plurality of subscribers belonging to the group in accordance with the calling number notification type identified by the calling number notification type identification section.

2. A call control apparatus comprising:
   a incoming call notification section which recognizes and notifies of an incoming call to a group ID number representing a group configured to include a plurality of subscribers selected at a user's discretion and commonly usable by an individual subscriber belonging to the group; and
   a call control section which, when occurrence of an incoming call to the group ID number is notified of from the incoming call notification section, makes a call to a terminal device of an individual subscriber belonging to the group to enable intercommunication of all the terminal devices which responded to the call;
   a calling number notification mode identification section for identifying a selection of a calling number notification mode of notifying a calling number to the plurality of subscribers belonging to the group, or a calling number non-notification mode of not notifying the calling number to the plurality of subscribers belonging to the group;
   wherein the calling number notification mode identification section comprises:
      a calling number notification mode recognition section for recognizing the selection of the calling number notification mode, and making a call with the calling number notified to the plurality of subscribers belonging to the group;
      a calling number non-notification mode recognition section for recognizing the selection of the calling number non-notification mode without notifying the calling number to the plurality of subscribers belonging to the group; and
      a calling number notification type identification section for identifying a calling number notification type whether a type-1 calling number notification of notifying a type-1 extended ID number having an individual identifier capable of identifying each of the plurality of subscribers is selected or a type-2 calling number notification of notifying the subscribers of the group ID number is selected;
   wherein the call control section makes a call with either the type-1 calling number notification or the type-2 calling number notification to the plurality of subscribers belonging to the group in accordance with the calling number notification type identified by the calling number notification type identification section.

3. The call control apparatus according to claim 2,
   wherein the incoming call notification section is further configured to be able to recognize that an incoming call to the type-1 extended ID number having an individual identifier capable of identifying the plurality of individual subscribers in the group corresponding to the group ID number occurs; and
   wherein, when occurrence of an incoming call to the type-1 extended ID number is notified of from the incoming call notification section, the call control section makes a call to the subscriber identified by the individual identifier.

4. The call control apparatus according to claim 2,
   wherein the incoming call notification section is further configured to be able to recognize that an incoming call to the type-2 extended ID number having a subgroup identifier capable of identifying a subgroup located on the lower layer of the group corresponding to the group ID number occurs; and wherein, when occurrence of an incoming call to the type-2 extended ID number is notified of from the incoming call notification section, the call control section makes a call to a subscriber belonging to the subgroup identified by the subgroup identifier.

5. The call control apparatus according to claim 2, further comprising a calling condition recognition section which recognizes a calling condition related to a subscriber belonging to the group corresponding to the group ID number, wherein the call control section makes a call to a terminal device of the subscriber according to the calling condition recognized by the calling condition recognition section.

6. The call control apparatus according to claim 2, wherein the call control section notifies the subscriber who did not respond to the call, of the subscribers who responded to the call.

7. The call control apparatus according to claim 2, wherein, when the intercommunication of the subscribers belonging to the group is performed via a predetermined MCU (Multi Point control Unit), and when an incoming call to the group ID number occurs, the call control section connects, to the MCU, the terminal device originating a call related to the incoming call.

8. The call control apparatus according to claim 2, wherein, when the intercommunication of the subscribers belonging to the group is performed via a predetermined MCU (Multi Point control Unit), and when the total number of terminal devices participating in the intercommunication of the subscribers decreases to two or less, the call control section switches a communication manner to a manner not using the MCU.

9. The call control apparatus according to claim 2, wherein, regarding intercommunication of the terminal devices of the subscriber belonging to the group, of the terminal devices participating the intercommunication, the call control section controls the continuation of the communication of a remote network terminal device based on a subscription contract with another common carrier different from the common carrier operating a local communication network to which the call control apparatus belongs.

10. The call control apparatus according to claim 2, wherein the call control section further comprises a service manner specifying command receiving section which receives, from the corresponding terminal device, a service manner specifying command specifying a predetermined service, and the call control section is configured to execute the service according to the service manner specifying command received by the service manner specifying command receiving section.

11. The call control apparatus according to claim 2, wherein the call control section further comprises an incoming call condition recognition section which recognizes an individual incoming call condition set to the individual subscriber, and the call control section executes a call to the terminal device of the individual subscriber in a manner based on the individual incoming call condition recognized by the incoming call condition recognition section.

\* \* \* \* \*